(12) United States Patent
Jacobson et al.

(10) Patent No.: US 7,055,673 B2
(45) Date of Patent: Jun. 6, 2006

(54) DEVICE FOR FEEDING THREADLIKE OBJECTS SUCH AS HOOKS FOR GARMENT HANGERS, A SYSTEM FOR CONVEYING AND FEEDING GARMENT HANGERS AND A METHOD FOR FEEDING THREADLIKE OBJECTS

(75) Inventors: Carl-Magnus Jacobson, Borås (SE); Ingvar Gustavsson, Ulricehamn (SE); Lars Follin, Sjömarken (SE)

(73) Assignee: Jensen Sweden Aktiebolag, Boras (SE)

( * ) Notice: Subject to any disclaimer, the term of this patent is extended or adjusted under 35 U.S.C. 154(b) by 119 days.

(21) Appl. No.: 10/505,062

(22) PCT Filed: Feb. 22, 2002

(86) PCT No.: PCT/SE02/00307

§ 371 (c)(1),
(2), (4) Date: Aug. 18, 2004

(87) PCT Pub. No.: WO03/070609

PCT Pub. Date: Aug. 28, 2003

(65) Prior Publication Data

US 2005/0115802 A1    Jun. 2, 2005

(51) Int. Cl.
*B65G 29/00* (2006.01)

(52) U.S. Cl. .............. 198/463.4; 198/530; 198/678.1
(58) Field of Classification Search ............... 198/530, 198/531, 532, 463.4, 678.1, 680, 465.4
See application file for complete search history.

(56) References Cited

U.S. PATENT DOCUMENTS

| 3,579,953 A | * | 5/1971 | Gianese ............... 198/532 |
| 3,799,318 A | | 3/1974 | Dekoekkoek |
| 3,961,699 A | * | 6/1976 | Hirsch ............... 198/464.1 |

(Continued)

FOREIGN PATENT DOCUMENTS

DK           162932 B     12/1991

(Continued)

OTHER PUBLICATIONS

International Search Report for PCT Application No. PCT/SE02/00307, filed Feb. 22, 2002; Search Completed Sep. 6, 2002.

*Primary Examiner*—James R. Bidwell
(74) *Attorney, Agent, or Firm*—Alston & Bird LLP

(57) ABSTRACT

The invention relates to a device (1) for feeding threadlike objects (2) such as hooks for garment hangers (3). The device (1) comprises a guide rail (4) along which threadlike objects (2) are to be conveyed, a feeder element (5) having a groove (6) into which threadlike objects (2) may be partially or completely received, the feeder element (5) being movable in relation to the guide rail (4) such that a threadlike object (2) received in the groove (6) can be conveyed by the feeder element (5) along the guide rail (4) as the groove (6) moves along the guide rail (4). The guide rail (4) is movable towards and away from the feeder element (5) such that a distance between the feeder element (5) and the guide rail (4) can be adjusted to the size of the threadlike objects (2) that pass through the device (1). The invention also relates to a system (22) for conveying and feeding garment hangers (3) from a first conveyor section (23) to a second conveyor section (24) and to a method for feeding threadlike objects.

19 Claims, 8 Drawing Sheets

U.S. PATENT DOCUMENTS 5,062,524 A * 11/1991 Nozaki et al. ............ 198/465.4
5,667,056 A * 9/1997 Kimmet ................... 198/465.4
6,199,682 B1 * 3/2001 Matkovich ............... 198/465.4
6,991,090 B1 * 1/2006 Gaertner .................... 198/680

FOREIGN PATENT DOCUMENTS

EP 0 560 106 A1 9/1993
SE 513 306 C2 6/2000

* cited by examiner

DEVICE FOR FEEDING THREADLIKE OBJECTS SUCH AS HOOKS FOR GARMENT HANGERS, A SYSTEM FOR CONVEYING AND FEEDING GARMENT HANGERS AND A METHOD FOR FEEDING THREADLIKE OBJECTS

TECHNICAL FIELD

The present invention relates to a feeding device for feeding threadlike objects, in particular hooks for garment hangers. The invention also relates to a system for conveying and feeding garment hangers and to a method for feeding threadlike objects.

BACKGROUND OF THE INVENTION

In for example laundries, garments are conveyed on garment hangers with hooks. In connection with transport of the garment hangers, separators are used to separate the garment hangers from each other and convey separate garment hangers forward. Such a separator can take the form of a feeding device that picks a separate garment hanger from a plurality of garment hangers and feeds the garment hanger forward. As the separate garment hangers are fed forward, a distance can be created between individual garment hangers. Typically, the separator or feeding device engages the hooks of the garment hangers. A problem for such a feeding device is that different garment hangers may have hooks of varying dimensions. The hooks are often formed from a circular cylindrical metal wire and different hooks can be formed from metal wires of different diameter. Therefore, the feeding device must be able to engage hooks of varying dimensions/different diameter. In the Danish patent publication 162932 B, a separator device is disclosed that is said to be able to accommodate hooks of different thickness. In the device according to the above-mentioned publication, one hook at the time is fed forward while the next hook to be fed forward is held in place.

It is an object of the current invention to provide a separator device for threadlike objects such as hooks for garment hangers. It is an additional object of the invention to provide a separator device that can feed threadlike objects forward one at the time and that is able to accommodate threadlike objects of varying dimension, in particular such hooks for garment hangers that are made of metal wire of different diameter. It is also an object of the invention to provide a system for conveying and feeding garment hangers. Furthermore, it is an object of the invention to provide a method for feeding threadlike objects such as hooks for garment hangers.

DESCRIPTION OF THE INVENTION

According to one aspect of the invention, a separator device for feeding threadlike objects such as hooks for garment hangers comprises a guide rail along which threadlike objects are to be conveyed and a feeder element having a groove into which threadlike objects may be partially or completely received. The feeder element is movable in relation to the guide rail such that a threadlike object received in the groove can be conveyed by the feeder element along the guide rail as the groove moves along the guide rail and the guide rail is movable towards and away from the feeder element such that a distance between the feeder element and the guide rail can be adjusted to the size of the threadlike objects that pass through the device.

Preferably, the feeder element is rotatably journalled and the guide rail has a curved section such that a threadlike object is conveyed in an arc along the guide rail by the feeder element when the feeder element rotates.

In an advantageous embodiment of the invention, a resilient member is arranged to cooperate with the guide rail such that, when the guide rail is moved away from the feeder element, the resilient member will act on the guide rail to urge it towards the feeder element. The resilient member may be arranged to be compressed as the guide rail is moved away from the feeder element.

Preferably, the feeder element is operatively connected to an actuator that is controlled by a logic unit. In one embodiment of the invention, the logic unit is connected to at least one sensor arranged to monitor an area at an upstream end of the feeding device to inform the logic unit of the presence or absence of a threadlike object such that the actuator can be started or shut of in response to a signal from the sensor that indicates the presence or absence of threadlike objects at the upstream end of the feeding device. In an especially advantageous embodiment, the logic unit is connected to a first sensor arranged to monitor the presence or absence of threadlike objects at a first position at an upstream end of the feeding device from which threadlike objects can be engaged by the groove of the feeder element and the logic unit is programmed to shut the actuator off when no threadlike object is in a position to be engaged by the feeder element. Preferably, a second sensor is also connected to the logic unit and arranged to monitor the presence or absence of threadlike objects at a second position upstream of the first position.

Preferably, the groove has a contour that is adapted to engage a threadlike object as the feeder element moves in one direction but to glide past threadlike objects as the feeder element moves in the opposite direction.

In an advantageous embodiment of the invention, the guide rail has a section forming a step that is located immediately upstream of the curved section such that threadlike objects may be conveyed along the step towards the feeder element in order to be received in the groove when the groove is located at the upstream end of the curved section. When a threadlike object is so large that it can only be partially received in the groove, a part of the threadlike object will extend over the step or a part of the step. The guide rail is further movable towards and away from the feeder element so that, when a part of a threadlike object extends over the step, rotation of the feeder element to convey the threadlike object forward causes the threadlike object to be pressed against the step. The guide rail will then be deflected away from the feeder element so that the distance between the feeder element and the guide rail is adjusted to the size of the threadlike object.

The guide rail is preferably rotatably journalled in a frame and the resilient member may be arranged in the frame with a contact piece being arranged between the resilient member and the guide rail such that, when a threadlike object received in the groove of the feeder element extends over the step, rotation of the feeder element causes the threadlike object to be pressed against the step so that the guide rail is caused to turn and thereby press the contact piece against the resilient member such that the resilient member is compressed. Alternatively, the resilient member can be arranged to be extended as the guide rail turns. Therefore, the resilient member can interact with the guide rail such that the resilient member is extended or compressed as the guide rail turns.

The invention also relates to a system for conveying and feeding garment hangers. The system according to the invention comprises a first conveyor section, a second conveyor section and a feeding device located between the first conveyor section and the second conveyor section. The feeding device is arranged to connect the conveyor sections such that it can feed garment hangers from the first conveyor section to the second conveyor section. The feeding device used in the inventive system is comprises a guide rail along which hooks for garment hangers are to be conveyed and a feeder element having a groove into which hooks for garment hangers may be partially or completely received. The feeder element is movable in relation to the guide rail such that a hook received in the groove can be conveyed by the feeder element along the guide rail as the groove moves along the guide rail and the guide rail and the feeder element are arranged relative to each other in such a way that a distance between the feeder element and the guide rail can be adjusted to the size of the threadlike objects that pass through the device. A suitable feeding device is the feeding device that has been separately described above.

The invention furthermore relates to a method for feeding threadlike objects such as hooks for garment hangers. The inventive method comprises the steps of providing a feeder element having a groove into which threadlike objects may be partially or completely received and providing a guide rail along which threadlike objects can be conveyed. Additionally, the method comprises the step of providing at least one threadlike object having a dimension larger than the size of the groove such that the threadlike object can only be partially received in the groove. The threadlike object is moved into the groove such that the threadlike object is partially received in the groove and a part of the threadlike object extends out of the groove. The feeder element is moved along the guide rail such that the threadlike object partially received in the groove is conveyed along the guide rail. Thereby, the guide rail is caused to move or be deflected away from the feeder element to an extent that corresponds to the dimension of that part of the threadlike object that extends out of the groove. In a preferred embodiment of the invention, it is the movement of the feeder element that causes the guide rail to be moved or deflected away from the feeder element.

Typically, a plurality of threadlike objects is provided where at least one of the threadlike objects has a dimension larger than the size of the groove and at least one of the threadlike objects has a dimension that is not larger than the size of the groove such that it can be completely received in the groove. The feeder element is then moved to engage the threadlike objects one after the other such that threadlike objects are fed in a sequence along the guide rail.

Preferably, the inventive method comprises the steps of investigating whether a threadlike object is present at a first location adjacent the guide rail and interrupting the movement of the feeder element if no threadlike object is present at the first location.

DETAILED DESCRIPTION OF THE INVENTION

Figure 1:
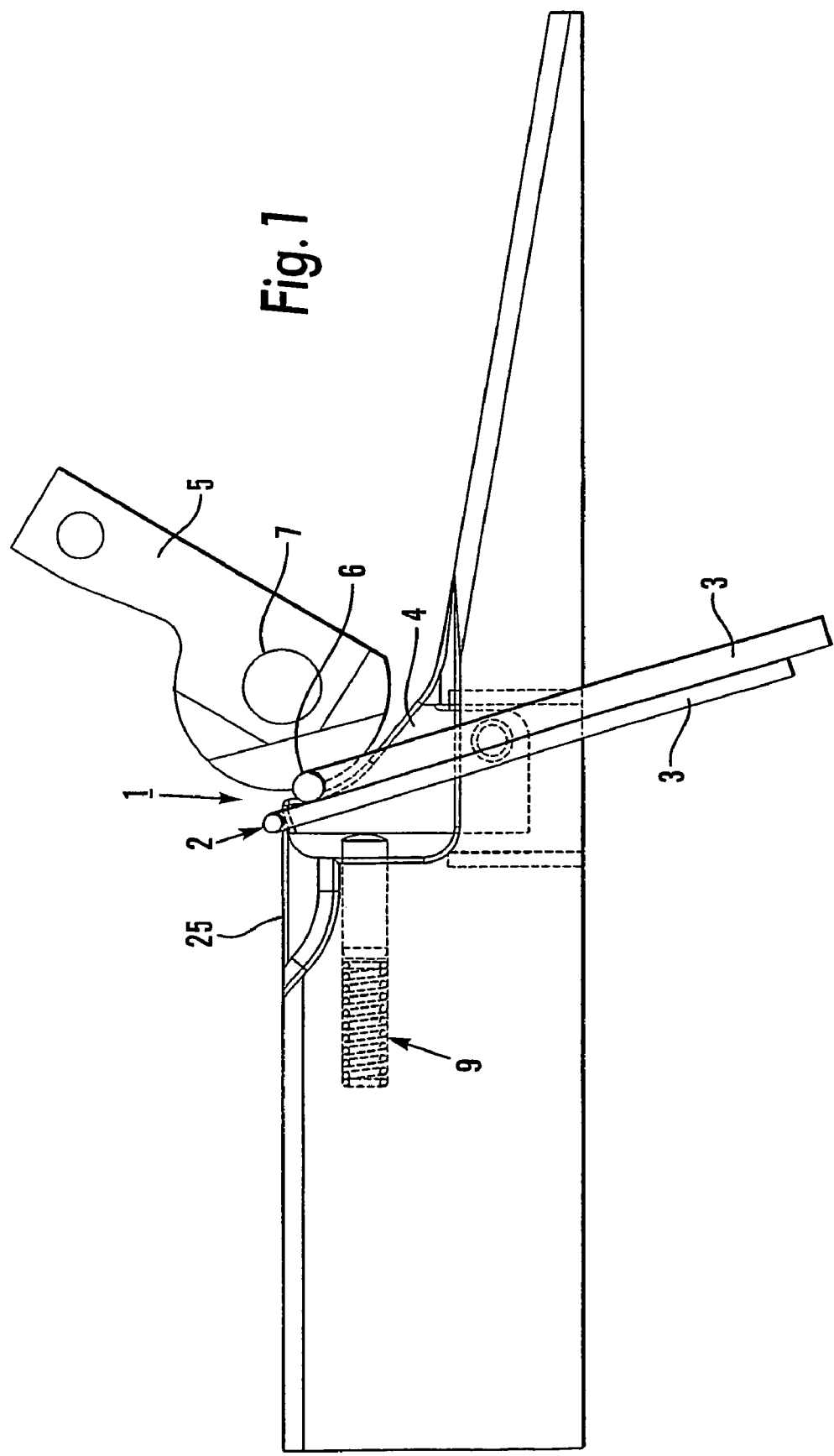
FIG. 1 shows a feeding device according to the present invention where one garment hanger is being fed through the feeding device and an other garment hanger is waiting to be fed through the feeding device.

With reference to FIG. 1, the invention relates to a device 1 for feeding threadlike objects 2 such as hooks for garment hangers 3. The device 1 comprises a guide rail 4 along which threadlike objects 2 are to be conveyed and a feeder element 5 having a groove 6 into which threadlike objects 2 may be partially or completely received. The feeder element 5 is movable in relation to the guide rail 4 such that a threadlike object 2 received in the groove 6 can be conveyed by the feeder element 5 along the guide rail 4 as the groove 6 moves along the guide rail 4 and the guide rail 4 is movable towards and away from the feeder element 5 such that a distance between the feeder element 5 and the guide rail 4 can be adjusted to the size of the threadlike objects 2 that pass through the device 1. By making the guide rail 4 movable, one obtains the advantage that threadlike objects 2 of varying dimension can be fed through the separator/feeding device 1.

In a preferred embodiment of the invention, the feeder element 5 is rotatably journalled and suitably journalled on a pivot pin 7 located in a frame and the guide rail 4 has a curved section 8 such that a threadlike object is conveyed in an arc along the guide rail 4 by the feeder element when the feeder element 5 rotates or pivots about the pivot pin 7. Alternatively, the feeder element 5 may be fixed to the pin 7 such that the feeder element turns or pivots together with the pin 7 as the pin 7 rotates in its frame.

Advantageously, a resilient member 9 is arranged to cooperate with the guide rail 4 such that, when the guide rail 4 is moved away from the feeder element 5, the resilient member 9 will act on the guide rail 4 to urge it towards the feeder element 5. The resilient member 9 is preferably arranged to be compressed as the guide rail 4 is moved away from the feeder element 5. Suitably, the resilient member 9 may be a coil spring. By providing a resilient member 9, one obtains the advantage that guide rail 4 can return automatically after a threadlike object 2 has been fed through the feeding device 1.

Figure 12:
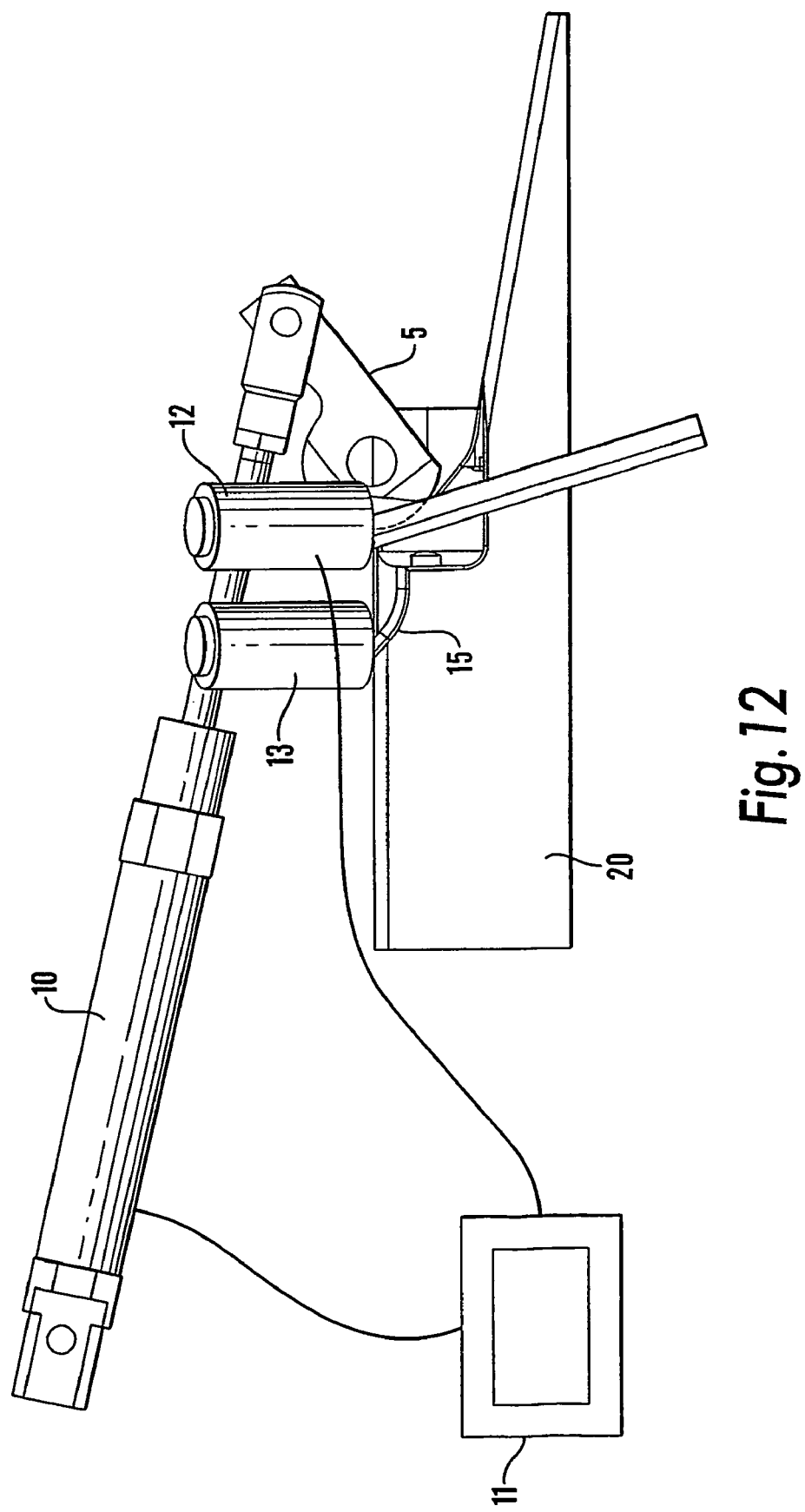
FIG. 12 shows how a logic unit connected to an actuator can be used to control operation of the feeding device.

As can be seen in FIG. 12, the feeder element 5 is operatively connected to an actuator 10 that is controlled by a logic unit 11 connected to at least one sensor 12 arranged to monitor an area 14 at an upstream end of the feeding device 1 to inform the logic unit 11 of the presence or absence of a threadlike object 2 such that the actuator 10 can be started or shut off in response to a signal from the sensor 12 that indicates the presence or absence of threadlike objects 2 at the upstream end of the feeding device 1.

The logic unit 11 is connected to a first sensor 12 arranged to monitor the presence or absence of threadlike objects at a first position 14 at an upstream end of the feeding device 1 from which threadlike objects 2 can be engaged by the groove 6 of the feeder element 5 and where the logic unit 11 is programmed to shut the actuator 10 off when no threadlike object 2 is in a position to be engaged by the feeder element 5. A second sensor 13 may be arranged to monitor the presence or absence of threadlike objects at a second position 15 upstream of the first position 14. Feeding of threadlike objects 2 from an upstream source of theadlike objects may be initiated in response to a signal from the second sensor 13 that indicates absence of threadlike objects at the second location 15. By using an actuator 10 controlled by a sensor 12 and a logic unit 11, one gains the advantage that the feeding device 1 will not operate empty.

Advantageously, the groove 6 of the feeder element 5 has a contour that is adapted to engage a threadlike object 2 as the feeder element 5 moves in one direction but to glide past threadlike objects as the feeder element 5 moves in the opposite direction.

Figures 8, 9, 10:
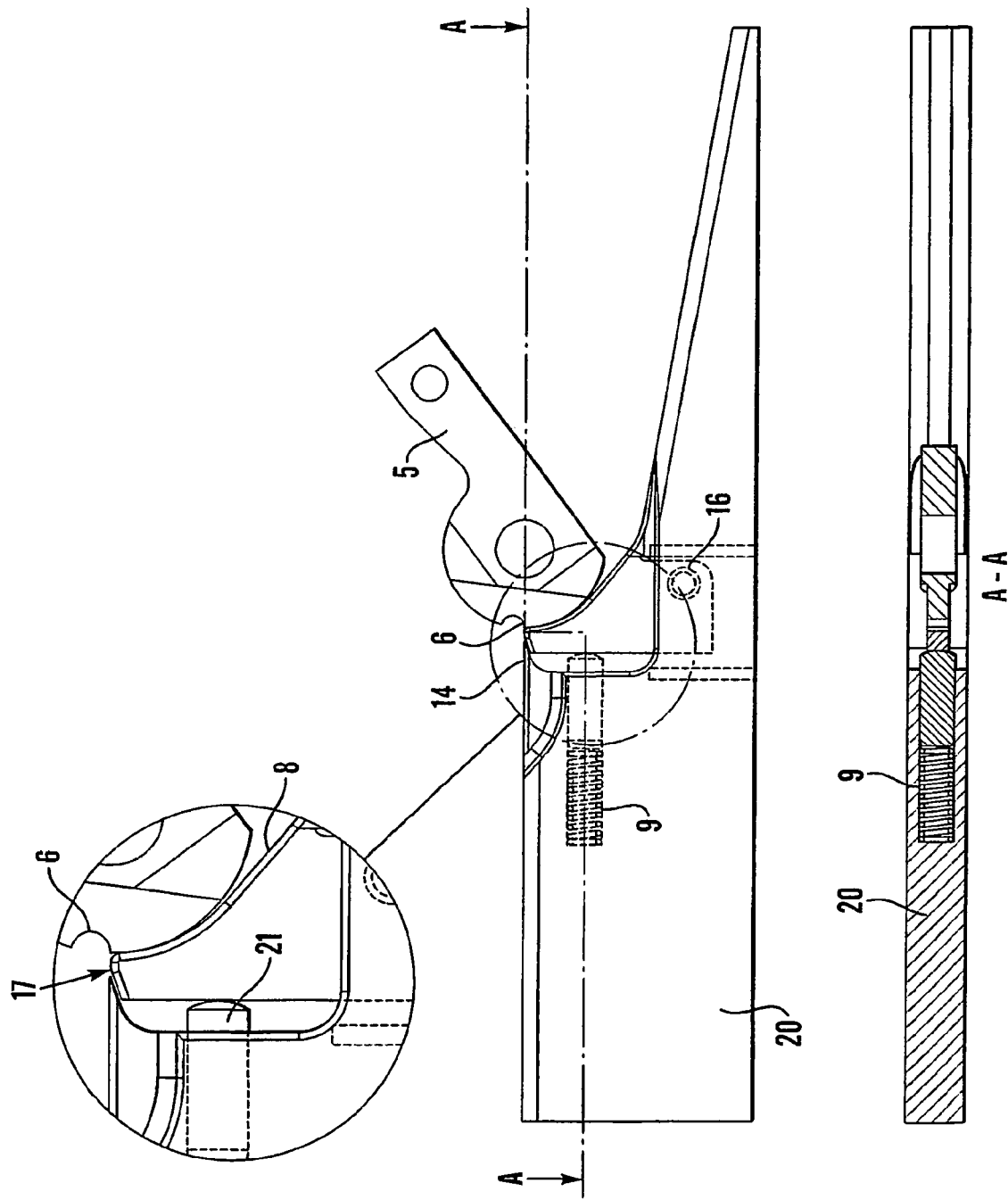
FIG. 8 shows the same feeding device as in FIG. 1 but without garment hangers.
FIG. 9 shows in a larger scale some of the details shown in FIG. 8.
FIG. 10 shows the feeding device of FIG. 8 in cross section along the line A—A
Figure 11:
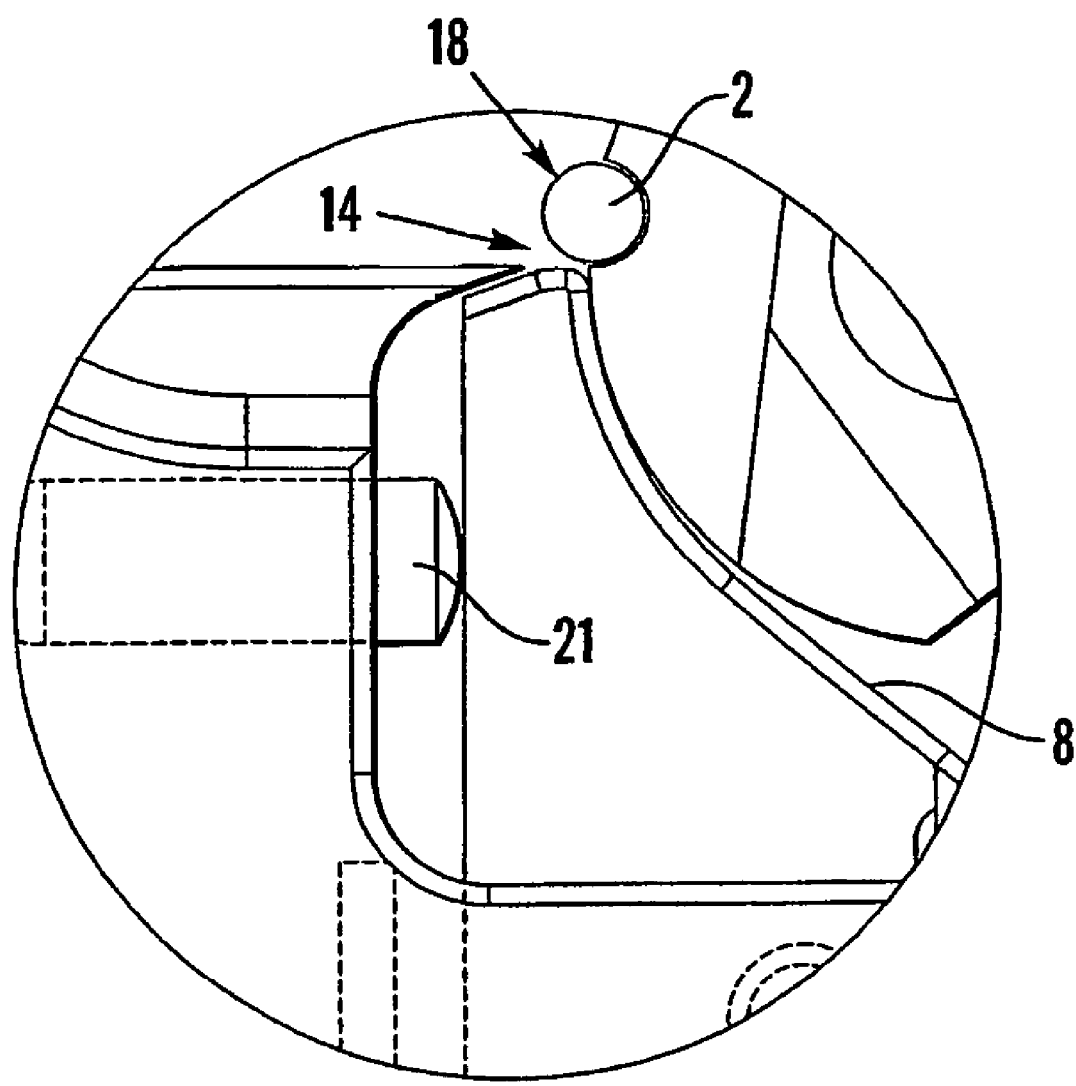
FIG. 11 is similar to FIG. 9 but also shows how a hook having a large dimension is received in the feeding device.

In a preferred embodiment of the invention, the guide rail 4 has a section forming a step 17 that is located immediately upstream of the curved section 8 as can best be seen in FIG. 9 and FIG. 11. Threadlike objects 2 may then be conveyed along or over the step 17 towards the feeder element 5 in order to be received in the groove 6 when the groove 6 is located at the upstream end of the curved section 8 such that, when a threadlike object 2 is so large that it can only be partially received in the groove 6, a part 18 of the threadlike object 2 will extend over the step 17 or a part of the step 17 and the guide rail 4 further being movable towards and away from the feeder element 5 so that, when a part 18 of a threadlike object 2 extends over the step 17, rotation of the feeder element 5 to convey the threadlike object 2 forward causes the threadlike object 2 to be pressed against the step 17. The guide rail 4 will then be deflected away from the feeder element 5 so that the distance between the feeder element 5 and the guide rail 4 is adjusted to the size of the threadlike object 2. By arranging the feeding device 1 so that the guide rail 4 is deflected by the feeder element 5, one gains the advantage that rotation of the feeding device 5 will be coordinated with the movement of the guide rail 4 away from the feeder element 5.

Preferably, the guide rail 4 is rotatably journalled in a frame 20 such that it can turn or pivot about a pin 16 or together with the pin 16 and the resilient member 9 is arranged in the frame 20 with a contact piece 21 being arranged between the resilient member 9 and the guide rail 4 such that, when a threadlike object 2 received in the groove 6 of the feeder element 5 extends over the step 17, rotation of the feeder element 5 causes the threadlike object 2 to be pressed against the step 17. This will cause the guide rail 4 to turn and thereby press the contact piece 21 against the resilient member 9 such that the resilient member 9 is compressed. Alternatively, the resilient member 9 can be arranged to be extended as the guide rail 4 turns. Therefore, the resilient member 9 can interact with the guide rail 4 such that the resilient member 9 is extended or compressed as the guide rail 4 turns. By making the guide rail 4 journalled so that it can turn, one gains the advantage of a very simple and reliable design.

Figure 2:
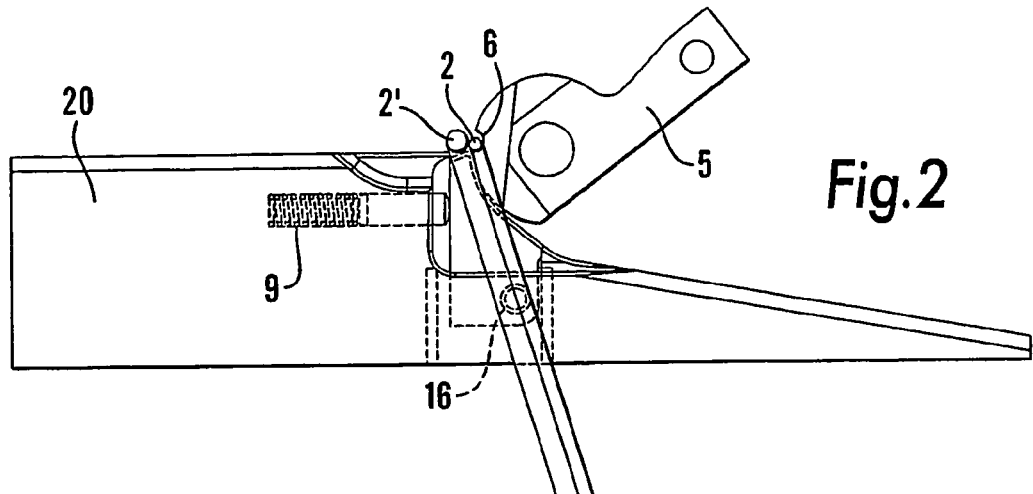
FIGS. 2–4 show operation of the feeding device when a hook having a first dimension is fed through the feeding device.
Figure 3:
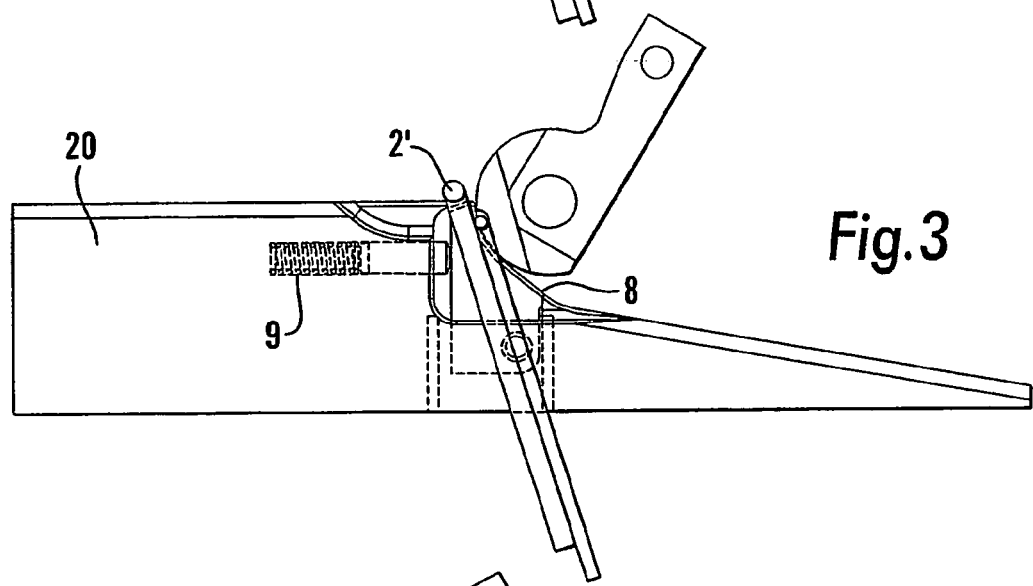
Figure 4:
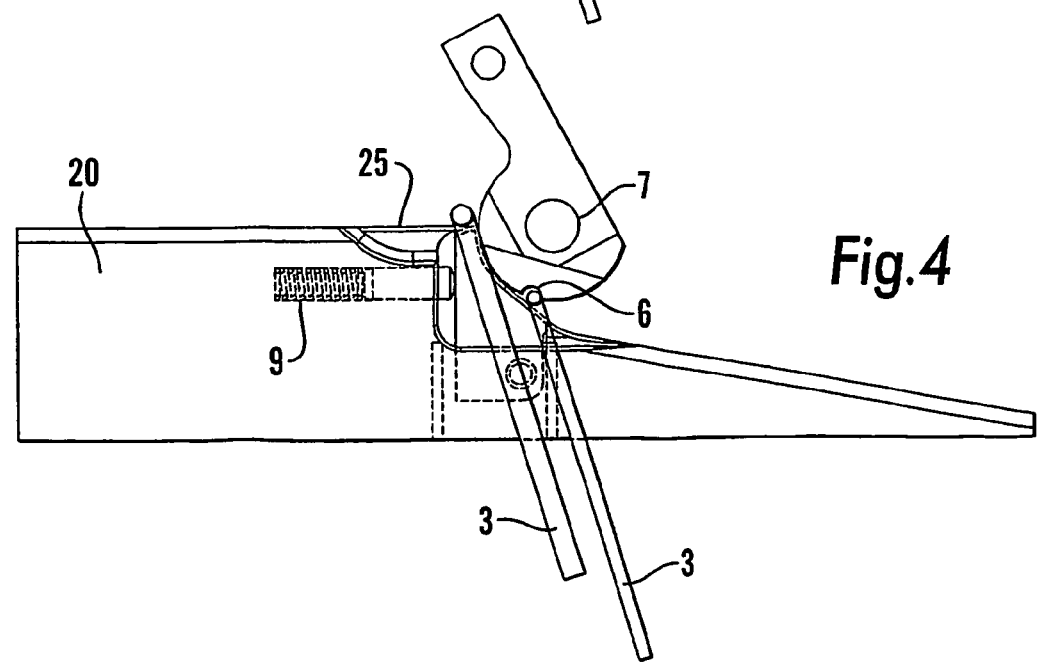
Figure 5:
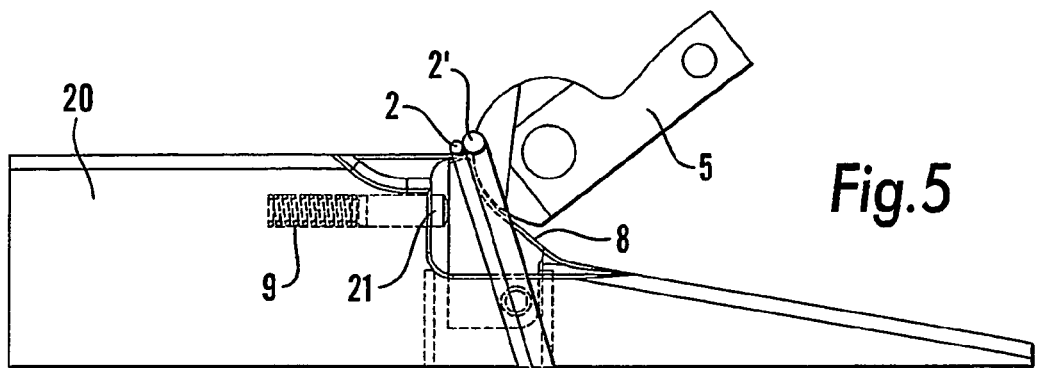
FIGS. 5–7 show how the feeding device is operated when a hook having a second dimension is fed through the feeding device.
Figure 6:
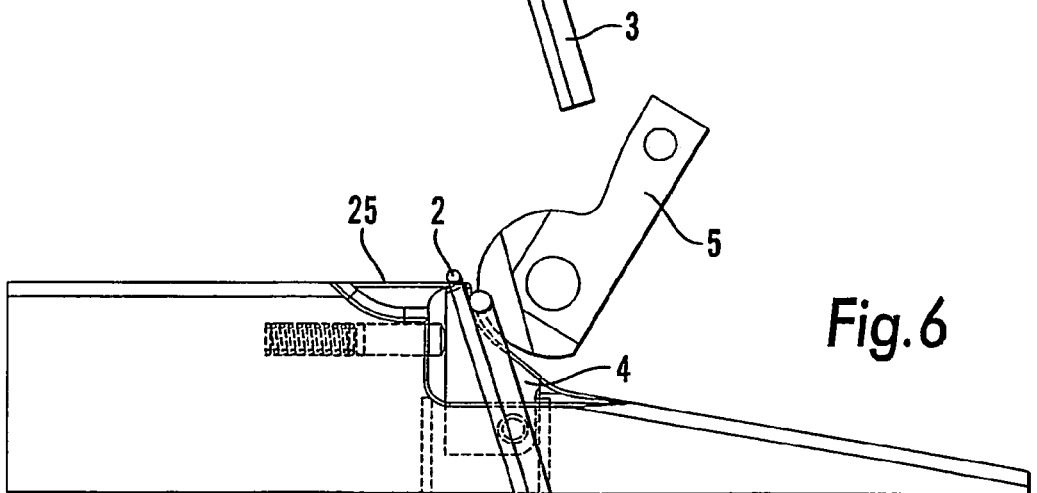
Figure 7:
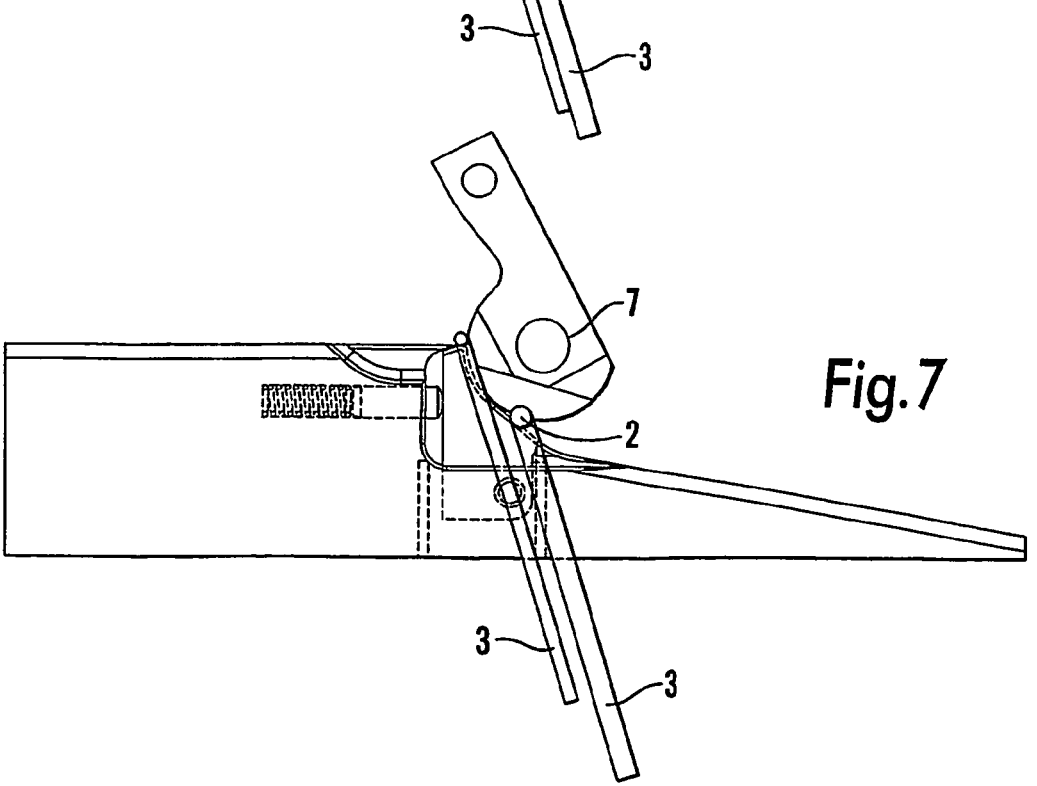

The operation of the feeding device or separator 1 is illustrated in FIGS. 2–7. In FIG. 2, a small diameter hook 2 of a garment hanger 3 has reached the groove 6 and been received in the groove 6. A hook 2' of larger diameter is waiting at an upstream position. In FIGS. 3 and 4, the hook 2 is fed through the device 1 as the feeder element 5 turns anti-clockwise. Since the hook 2 is completely received in the groove 6, the guide rail 4 is not deflected away. The feeder element 5 then turns clockwise back to its starting position where it engages a large diameter hook 2' which can only be partially received in the groove 6. As the feeder element 5 once again turns anti-clockwise, the hook 2' will be pressed against the step 17 which will cause the guide rail 4 to pivot such that the contact piece 21 is moved to compress the spring 9 as can be seen in FIG. 6.

As can be seen in for example FIG. 1, the frame 20 has a section 25 immediately upstream of the feeder 5. The section 25 is used for conveying threadlike objects forward to the feeder 5. To ensure that all threadlike objects or hooks 2 reach the feeder 5 at the same level, the section 25 has been made very narrow and is preferably not more than 2 mm wide. The frame 20 also has a section downstream of the guide rail 4 as can be seen in for example FIG. 1. The downstream section of the frame 20 has a glide surface such that threadlike objects or hooks 2 can glide forward on the glide surface.

Figure 13A:
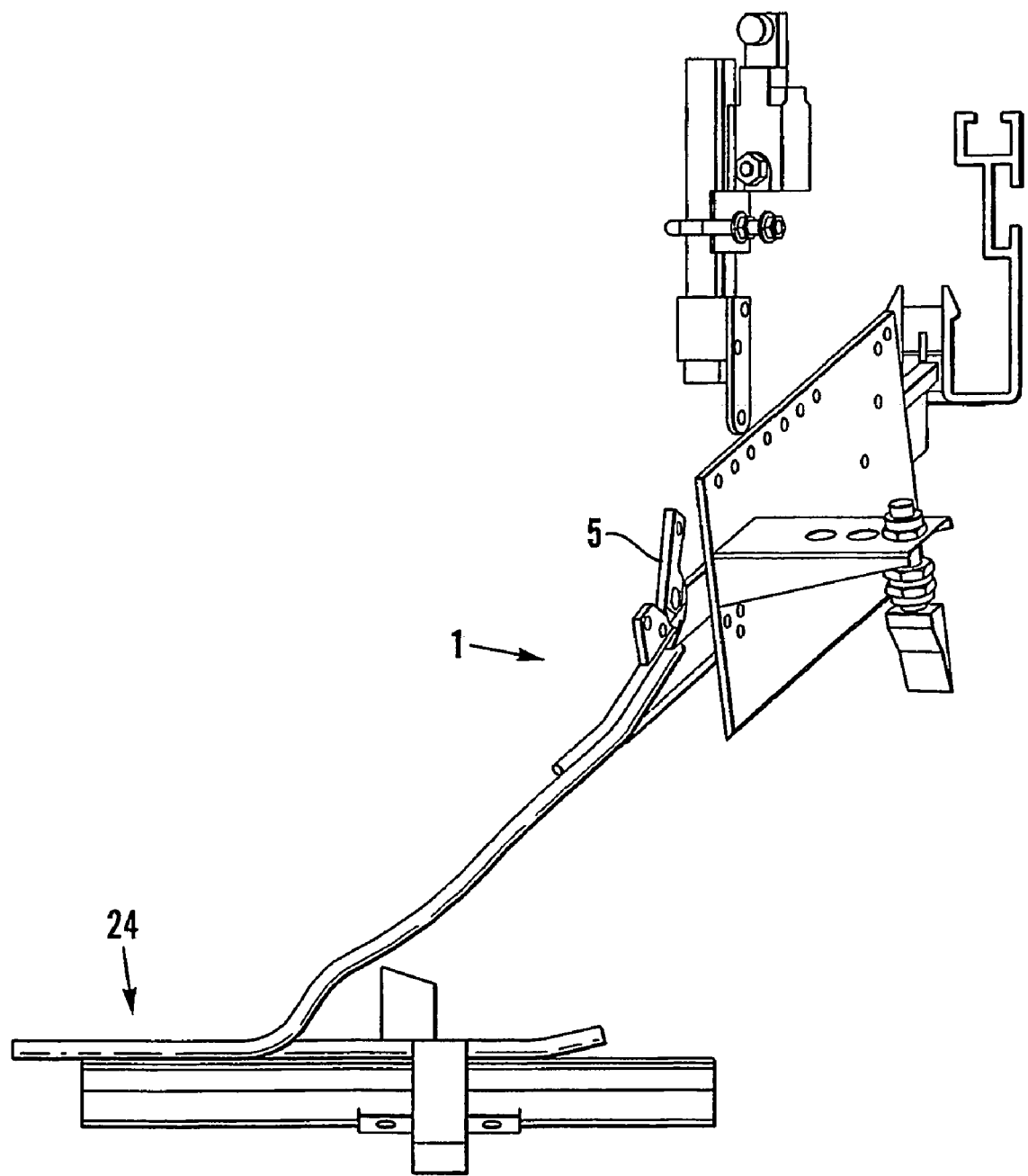
FIGS. 13A and 13B show, in perspective and from above, a system that incorporates the feeding device according to the invention.
Figure 13B:
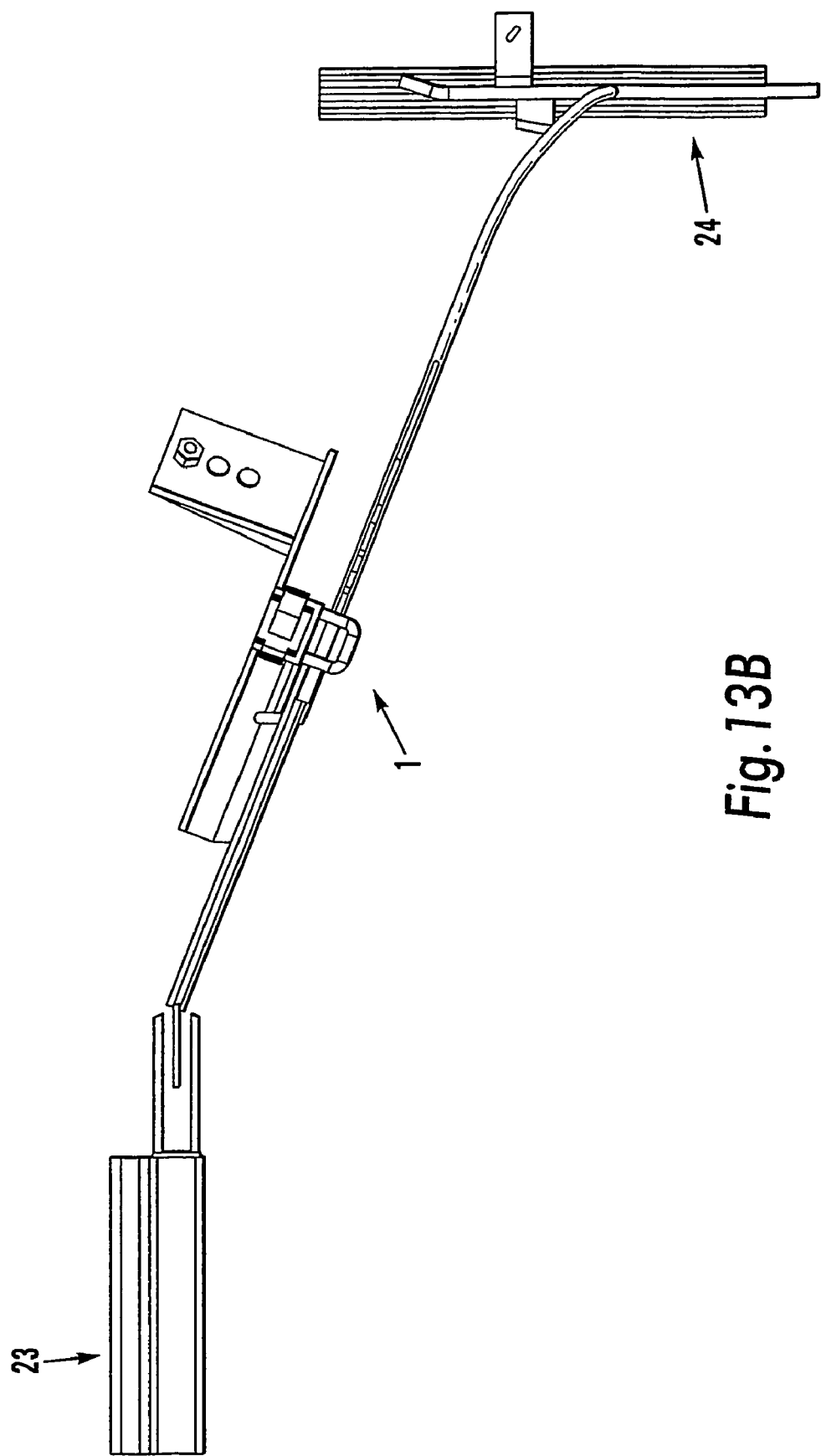

With reference to FIG. 13A and FIG. 13B, the invention also relates to a system 22 for conveying and feeding garment hangers. The system comprises a first conveyor section 23, a second conveyor section 24 and a feeding device 1 located between the first conveyor section 23 and the second conveyor section 24. The feeding device 1 is arranged to connect the conveyor sections 23, 24 such that it can feed garment hangers 3 from the first conveyor section 23 to the second conveyor section 24. The feeding device 1 comprises a guide rail 4 along which hooks 2 for garment hangers 3 are to be conveyed and a feeder element 5 having a groove 6 into which hooks for garment hangers may be partially or completely received. The feeder element 5 is movable in relation to the guide rail 4 such that a hook received in the groove 6 can be conveyed by the feeder element 5 along the guide rail 4 as the groove moves along the guide rail 4 and the guide rail 4 and the feeder element 5 are arranged relative to each other in such a way that a distance between the feeder element 5 and the guide rail 4 can be adjusted to the size of the threadlike objects 2 that pass through the device 1.

The invention also relates to a method for feeding threadlike objects 2 such as hooks 2 for garment hangers 3. The method comprises the steps of providing a feeder element 5 having a groove 6 into which threadlike objects 2 may be partially or completely received, providing a guide rail 4 along which threadlike objects 2 can be conveyed, providing at least one threadlike object 2 having a dimension larger than the size of the groove 6 such that the threadlike object 2 can only be partially received in the groove 6, moving the threadlike object 2 into the groove 6 such that the threadlike object 2 is partially received in the groove 6 and a part 18 of the threadlike object 2 extends out of the groove. The feeder element 5 is then moved along the guide rail 4 such that the threadlike object 2 partially received in the groove 6 is conveyed along the guide rail 4 and causes the guide rail 4 to move or be deflected away from the feeder element 5 to an extent that corresponds to the dimension of that part 18 of the threadlike object 2 that extends out of the groove 6. Suitably, it is the movement of the feeder element 5 that causes the guide rail 4 to be moved or deflected away from the feeder element 5. Typically, a plurality of threadlike objects 2 are provided. At least one of the threadlike objects 2 has a dimension larger than the size of the groove 6 and at least one of the threadlike objects 2 has a dimension that is not larger than the size of the groove 6 such that it can be completely received in the groove 6. The feeder element 5 is moved to engage the threadlike objects 2 one after the other such that threadlike objects 2 are fed in a sequence along the guide rail 4.

In an advantageous embodiment of the invention, the method comprises the steps of investigating whether a threadlike object 2 is present at a first location adjacent the guide rail 4 and interrupting the movement of the feeder element if no threadlike object 2 is present at the first location.

The invention brings about the advantage that threadlike objects such as hooks for garment hangers can reliably be separated from each other and fed forward, even when the threadlike objects are not of the same dimension.

The invention claimed is:

1. A device (1) for feeding threadlike objects (2) such as hooks for garment hangers (3), the device (1) comprising: a guide rail (4) along which threadlike objects (2) are to be conveyed, a feeder element (5) having a groove (6) into which threadlike objects (2) may be partially or completely received, the feeder element (5) being movable in relation to the guide rail (4) such that a threadlike object (2) received in the groove (6) can be conveyed by the feeder element (5) along the guide rail (4) as the groove (6) moves along the guide rail (4) and the guide rail (4) being movable towards and away from the feeder element (5) such that a distance between the feeder element (5) and the guide rail (4) can be adjusted to the size of the threadlike objects (2) that pass through the device (1).

2. A feeding device (1) according to claim 1 wherein the feeder element (5) is rotatably journalled and the guide rail (4) has a curved section (8) such that a threadlike object is conveyed in an arc along the guide rail (4) by the feeder element when the feeder element (5) rotates.

3. A feeding device according to claim 1 wherein a resilient member (9) is arranged to cooperate with the guide rail (4) such that, when the guide rail (4) is moved away from the feeder element (5), the resilient member (9) will act on the guide rail (4) to urge it towards the feeder element (5).

4. A feeding device according to claim 3 wherein the resilient member (9) is arranged to be compressed as the guide rail (4) is moved away from the feeder element (5).

5. A feeding device according to claim 1 wherein the feeder element (5) is operatively connected to an actuator (10) that is controlled by a logic unit (11) connected to at least one sensor (12) arranged to monitor an area (14) at an upstream end of the feeding device (1) to inform the logic unit (11) of the presence or absence of a threadlike object (2) such that the actuator (10) can be started or shut off in response to a signal from the sensor (12) that indicates the presence or absence of threadlike objects (2) at the upstream end of the feeding device.

6. A feeding device according to claim 5 wherein the logic unit (11) is connected to a first sensor (12) arranged to monitor the presence or absence of threadlike objects at a first position (14) at an upstream end of the feeding device (1) from which threadlike objects (2) can be engaged by the groove (6) of the feeder element (5) and where the logic unit (11) is programmed to shut the actuator (10) off when no threadlike object (2) is in a position to be engaged by the feeder element (5) and a second sensor (13) is arranged to monitor the presence or absence of threadlike objects at a second position (15) upstream of the first position (14).

7. A feeding device according to claim 1 wherein the groove (6) has a contour that is adapted to engage a threadlike object (2) as the feeder element (5) moves in one direction but to glide past threadlike objects as the feeder element (5) moves in the opposite direction.

8. A device for feeding threadlike objects such as hooks (2) for garment hangers (3) which comprises a guide rail (4) having a curved section (8) along which threadlike objects (2) are to be conveyed, a feeder element (5) having a groove (6) into which threadlike objects (2) may be partially or completely received, the feeder element (5) being rotatably journalled such that a threadlike object (2) received in the groove (6) can be conveyed by the feeder element (5) in an arc along the curved section (8) of the guide rail (4) as the groove (6) moves along the curved section (8) of the guide rail (4), the guide rail (4) further having a section forming a step (17) that is located immediately upstream of the curved section (8) such that threadlike objects (2) may be conveyed along the step (17) towards the feeder element (5) in order to be received in the groove (6) when the groove (6) is located at the upstream end of the curved section (8) such that, when a threadlike object (2) is so large that it can only be partially received in the groove (6), a part (18) of the threadlike object (2) will extend over the step (17) or a part of the step (17) and the guide rail (4) further being movable towards and away from the feeder element (5) so that, when a part (18) of a threadlike object (2) extends over the step (17), rotation of the feeder element (5) to convey the threadlike object (2) forward causes the threadlike object (2) to be pressed against the step (17), the guide rail (4) will be deflected away from the feeder element (5) so that the distance between the feeder element (5) and the guide rail (4) is adjusted to the size of the threadlike object (2).

9. A feeding device (1) according to claim 8 wherein a resilient member (9) is arranged to cooperate with the guide rail (4) such that, when the guide rail (4) is moved away from the feeder element (5), the resilient member (9) will act on the guide rail (4) to urge it towards the feeder element (5).

10. A feeding device according to claim 8 wherein the guide rail (4) is rotatably journalled in a frame (20) and where the resilient member (9) is arranged in the frame (20) and a contact piece (21) is arranged between the resilient member (9) and the guide rail (4) such that, when a threadlike object (2) received in the groove (6) of the feeder element (5) extends over the step (17), rotation of the feeder element (5) causes the threadlike object (2) to be pressed against the step (17) so that the guide rail (4) is caused to turn and thereby press the contact piece (21) against the resilient member (9) such that the resilient member (9) is compressed.

11. A device (1) for feeding garment hangers (3) which comprises a guide rail (4) having a curved section (8) along which hooks (2) for garment hangers (3) are to be conveyed, a feeder element (5) having a groove (6) into which hooks (2) may be partially or completely received, the feeder element (5) being rotatably journalled such that a garment hanger hook (2) received in the groove (6) can be conveyed by the feeder element (5) in an arc along the curved section (8) of the guide rail (4) as the groove (6) moves along the curved section (8) of the guide rail (4), the guide rail (4) further having a section forming a step (17) that is located immediately upstream of the curved section (8) such that hooks (2) for garment hangers (3) may be conveyed along the step (17) towards the feeder element (5) in order to be received in the groove (6) when the groove (6) is located at the upstream end of the curved section (8) such that, when a hook (2) is so large that it can only be partially received in the groove (6), a part of the hook (2) will extend over a part of the step (17) and the guide rail (4) further being rotatably journalled in a frame (20) such that, when a hook (2) received in the groove (6) of the feeder element (5) extends over the step (17), rotation of the feeder element (5) causes the hook (2) to be pressed against the step (17) so that the guide rail (4) is deflected and caused to turn, a resilient member (9) being arranged to interact with the guide rail (4) such that the resilient member (9) is extended or compressed as the guide rail (4) turns.

12. A system (22) for conveying and feeding garment hangers, the system comprising: a first conveyor section (23), a second conveyor section (24) and a feeding device (1) located between the first conveyor section (23) and the second conveyor section (24), the feeding device (1) being arranged to connect the conveyor sections such that it can feed garment hangers (3) from the first conveyor section (23) to the second conveyor section (24), the feeding device (1) comprising a guide rail (4) along which hooks (2) for garment hangers (3) are to be conveyed, a feeder element (5) having a groove (6) into which hooks for garment hangers may be partially or completely received, the feeder element (5) being movable in relation to the guide rail (4) such that a hook received in the groove (6) can be conveyed by the feeder element (5) along the guide rail (4) as the groove moves along the guide rail (4) and the guide rail (4) and the feeder element (5) being arranged relative to each other in such a way that a distance between the feeder element (5) and the guide rail (4) can be adjusted to the size of the threadlike objects (2) that pass through the device (1).

13. A system according to claim 12 wherein the guide rail (4) has a curved section (8) along which threadlike objects (2) are to be conveyed and the feeder element (5) is rotatably journalled such that a hook received in the groove (6) can be conveyed by the feeder element (5) in an arc along the curved section (8) of the guide rail (4) as the groove (6) moves along the curved section (8) of the guide rail (4), the guide rail (4) further having a section forming a step (17) that is located immediately upstream of the curved section (8) such that hooks for garment hangers may be conveyed along the step (17) towards the feeder element (5) in order to be received in the groove (6) when the groove (6) is located at the upstream end of the curved section (8) such that, when a hook (2) is so large that it can only be partially received in the groove (6), a part (18) of the hook (2) will extend over at least a part of the step (17) and the guide rail (4) further being rotatably journalled in a frame (20) such that, when a hook (2) received in the groove (6) of the feeder element (5) extends over the step (17), rotation of the feeder element (5) causes the hook (2) to be pressed against the step (17) so that the guide rail (4) is deflected and caused to turn.

14. A system (22) according to claim 12 wherein the feeder element (5) is operatively connected to an actuator (10) that is controlled by a logic unit (11) connected to at least one sensor (12) arranged to monitor an area (14) at an upstream end of the feeding device to inform the logic unit (11) of the presence or absence of a garment hanger (3) such that the actuator (10) can be started or shut off in response to a signal from the sensor (12, 13) that indicates the presence or absence of garment hangers at the upstream end of the feeding device (1).

15. A system according to claim 14 wherein the logic unit (11) is connected to a first sensor (12) arranged to monitor the presence or absence of garment hangers at a first position (14) at an upstream end of the feeding device (1) from which hooks (2) for garment hangers (3) can be engaged by the groove (6) of the feeder element (5) and where the logic unit (11) is programmed to shut the actuator (10) off when no hook is in a position to be engaged by the feeder element (5) and a second sensor is arranged to monitor the presence or absence of garment hangers at a second position (15) upstream of the first position (14).

16. A method for feeding threadlike objects (2) such as hooks (2) for garment hangers (3), the method comprising the steps of: providing a feeder element (5) having a groove (6) into which threadlike objects (2) may be partially or completely received, providing a guide rail (4) along which threadlike objects (2) can be conveyed, providing at least one threadlike object (2) having a dimension larger than the size of the groove (6) such that the threadlike object (2) can only be partially received in the groove (6), moving the threadlike object (2) into the groove (6) such that the threadlike object (2) is partially received in the groove (6) and a part (18) of the threadlike object (2) extends out of the groove, moving the feeder element (5) along the guide rail (4) such that the threadlike object (2) partially received in the groove (6) is conveyed along the guide rail (4) and causing the guide rail (4) to move or be deflected away from the feeder element (5) to an extent that corresponds to the dimension of that part (18) of the threadlike object (2) that extends out of the groove (6).

17. A method according to claim 16 wherein the movement of the feeder element (5) causes the guide rail (4) to be moved or deflected away from the feeder element (5).

18. A method according to claim 17 wherein a plurality of threadlike objects (2) are provided, at least one of the threadlike objects (2) having a dimension larger than the size of the groove (6) and at least one of the threadlike objects (2) having a dimension that is not larger than the size of the groove (6) such that it can be completely received in the groove (6) and moving the feeder element (5) to engage the threadlike objects (2) one after the other such that threadlike objects (2) are fed in a sequence along the guide rail (4).

19. A method according to claim 18 further comprising the steps of: investigating whether a threadlike object (2) is present at a first location adjacent the guide rail and interrupting the movement of the feeder element if no threadlike object is present at the first location.

* * * * *